W. KAITTILA.
SLED.
APPLICATION FILED MAY 13, 1920.
1,415,877.
Patented May 16, 1922.
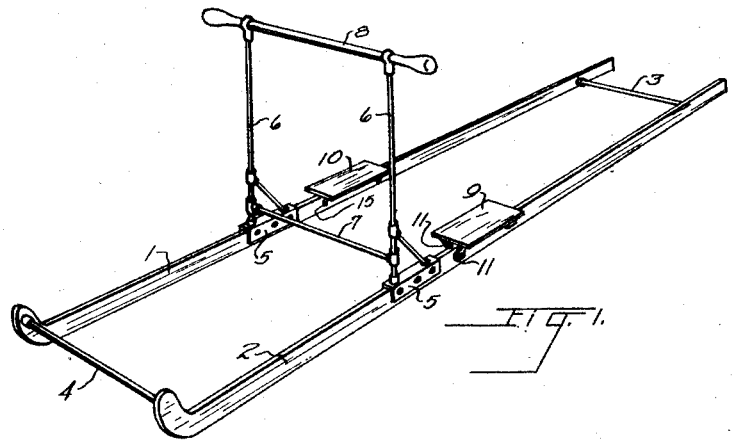
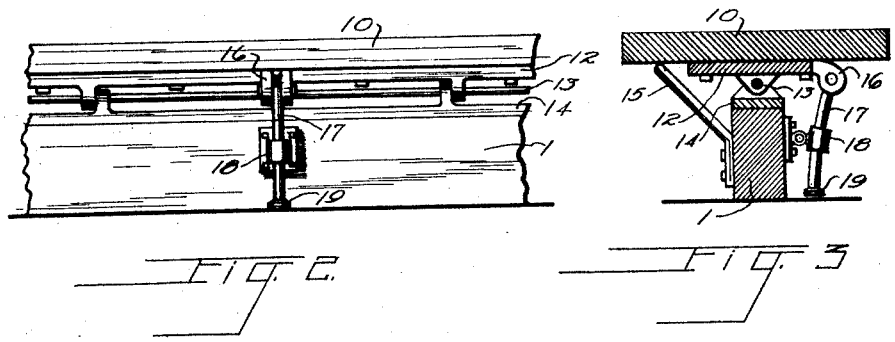
Witnesses
William T. Piper
C. L. Osgood
Inventor
W. Kaittila
By H. J. Sanders
Atty.

UNITED STATES PATENT OFFICE.

WILPPU KAITTILA, OF GRAYLING, MICHIGAN.

SLED.

1,415,877.  Specification of Letters Patent.  Patented May 16, 1922.

Application filed May 13, 1920. Serial No. 381,080.

*To all whom it may concern:*

Be it known that I, WILPPU KAITTILA, a citizen of Finland, residing at Grayling, in the county of Crawford and State of Michigan, have invented certain new and useful Improvements in Sleds, of which the following is a specification.

This invention relates to improvements in sleds and more particularly to children's sleds in which the rider stands upon a pair of foot rests arranged upon the runners and holds to or guides the sled by means of a handle bar arranged in advance of the foot rests. A further object is the provision of a foot-controlled brake readily operated by the rider to check the speed of the sled while coasting, etc. With the foregoing and other objects in view the invention consists in the combination and arrangement of parts to be hereinafter fully described, pointed out in the appended claim and illustrated in the accompanying drawing which forms a part of this specification and in which—

Fig. 1 is a perspective view of my improved sled.

Fig. 2 is an enlarged fragmentary view illustrating the combination of foot rest and brake.

Fig. 3 is an end view of Fig. 2.

Like reference characters denote corresponding parts throughout the several views.

My sled comprises the runners 1, 2 connected by the end bars 3, 4. Clamps 5 secured to the runners carry the uprights 6 which are connected by the tie rod 7, said uprights carrying the handle bar 8. Adjacent the clamps 5 and in a direction toward the rear end of the runners are the foot rests 9 and 10, the foot rest 9 being rigidly secured to the runners 2 by braces 11. The foot rest 10 is provided with a plate 12 that is formed with downturned ends connected by pivot bar 13 to the upturned ends of the plate 14 arranged upon the upper edge of the runner 1. Supporting bars 15 secured to the relatively inner lateral face of the runner 1 extend obliquely upward therefrom and at their free ends support the foot rest 10 at one of its lateral edges. Upon the opposite side of the runner 1, with relation to the bars 15, a link 16 is secured to the plate 12 and said link pivotally carries a brake rod 17, that extends through a guide bracket 18 secured to the runner 1, that terminates in the head 19 adapted to frictionally engage the roadway as a brake to arrest or retard the movement of the sled.

The side of the foot rest 10 adapted to rest upon the bars 15 is heavier than the brake-supporting side, or the foot rest may be supported off longitudinal center so that normally the brake head is retained off the ground. The rider, to put the brake in operation, presses down with one foot, or rests his weight, upon the brake-supporting side of the foot rest and so tilts it and drives the brake rod into operative engagement with the road.

What is claimed is:—

In a sled, a foot rest pivotally carried by one of the sled runners, angle bars secured to one side of the sled runner for supporting engagement with one lateral edge of said foot rest, a guide bracket secured to the opposite side of said runner, and a brake rod pivotally carried by said foot rest and extending through said guide bracket for frictional engagement with the roadway in one position of said foot rest.

In testimony that I claim the foregoing as my own I have hereto affixed my signature in the presence of two subscribing witnesses.

WILPPU KAITTILA.

Witnesses:
 O. P. SCHURMANN,
 O. PALMER.